United States Patent
Then et al.

(10) Patent No.: US 6,860,457 B2
(45) Date of Patent: Mar. 1, 2005

(54) HOLDER FOR VESSELS, ESPECIALLY DRINK CONTAINERS

(75) Inventors: Gebhard Then, Bad Neustadt (DE); Thilo Schultheis, Salz (DE)

(73) Assignee: Preh-Werke GmbH & Co. KG, Bad Neustadt a.d. Saale (DE)

( * ) Notice: Subject to any disclaimer, the term of this patent is extended or adjusted under 35 U.S.C. 154(b) by 0 days.

(21) Appl. No.: 10/307,933

(22) Filed: Dec. 3, 2002

(65) Prior Publication Data

US 2003/0106976 A1 Jun. 12, 2003

(30) Foreign Application Priority Data

Dec. 12, 2001 (DE) .......................................... 101 61 122

(51) Int. Cl.[7] .................................................. A47K 1/08
(52) U.S. Cl. ..................................... 248/311.2; 224/926
(58) Field of Search ............................. 248/311.2, 313, 248/154, 314; 224/926, 542, 544, 556, 570, 456; 297/188.14; 220/737

(56) References Cited

U.S. PATENT DOCUMENTS

| | | | | |
|---|---|---|---|---|
| 5,413,299 A | * | 5/1995 | Holtsch | 248/313 |
| 5,782,448 A | | 7/1998 | Withun et al. | 248/311.2 |
| 5,791,618 A | | 8/1998 | Lancaster | 248/311.2 |
| 5,839,711 A | * | 11/1998 | Bieck et al. | 248/313 |

FOREIGN PATENT DOCUMENTS

| | | |
|---|---|---|
| DE | 4432036 A1 | 3/1995 |
| DE | 197 24 599 A1 | 6/1998 |
| DE | 19729689 A1 | 1/1999 |
| DE | 299 20 019 U1 | 2/2000 |
| DE | 100 43 720 A1 | 4/2002 |
| DE | 101 02 559 A1 | 8/2002 |
| EP | 0800954 B1 | 10/1997 |

OTHER PUBLICATIONS

DEX Patent No. 19729689, ABSTRACT.

* cited by examiner

*Primary Examiner*—Anita King
*Assistant Examiner*—Jon Szumny
(74) *Attorney, Agent, or Firm*—Birch, Stewart, Kolasch & Birch, LLP

(57) ABSTRACT

During vehicle travel, a container can be pushed, pressed downwards and lifted, but not rotated. As such, a holder is provided that enables the removal of a container, by rotating the container about a vertical axis. The holder comprises clamping lugs that have a rotatable part integrated into the clamping lugs and snapped into an axial bearing of the clamping lugs. The rotatable part is designed in the shape of a cylinder, and is pressed into a stable center position by means of a type of torsion spring. The rotatable part projects outwards, relative to the clamping lug at the tip and upper side of the clamping lug, so that even when the clamping lug is deflected, the part can contact any diameter container. Furthermore, when the part is in a center position, there is preferably a sprayed-on elastomer or other rubber-like material forming a contact surface.

9 Claims, 4 Drawing Sheets

HOLDER FOR VESSELS, ESPECIALLY DRINK CONTAINERS

This nonprovisional application claims priority under 35 U.S.C. §119(a) on Patent Application No. 101 61 122.6 filed in Germany on Dec. 12, 2001, which is herein incorporated by reference.

BACKGROUND OF THE INVENTION

1. Field of the Invention

The present invention relates to a holder for vessels.

2. Description of the Background Art

A conventional holder for vessels is known from DE 44 32 036 A1, especially for beverage containers, in which a wide range of vessels of different shapes and dimensions can be held securely upright. The compensating elements used can adjust themselves such that they are always adjusted to the outer surface of the vessel inserted in an opening. Tabs made of elastic material which project radially inward into the associated opening, are arranged on the support element and are provided as compensating elements. This material can be an elastomer or a silicone rubber.

EP 0 800 954 B1 discloses a generic holder for a drink container that has holding jaws or so-called clamping lugs that have retaining surfaces with different radial spacings from the center of the container receptacle. Such holding jaws are, conventionally, made of a thermoplastic material.

A disadvantage of such holders is that they cannot always hold the vessels securely, especially in extreme movements of a motor vehicle, such as on jagged or rough roads or during tight cornering.

SUMMARY OF THE INVENTION

An object of the present invention is to create a holder for a vessel that is capable of securely holding the vessel therein, even during extreme motions.

Accordingly, the present invention provides a holder for vessels that have a container receptacle for at least one vessel and clamping lugs, which can be forced into the container receptacle. The clamping lugs can be pivoted radially into a circumferential wall of the container receptacle, and also have a rotatable part that is integrated into the clamping lugs and that is snapped into an axial bearing of the clamping lugs.

Derived from the consideration that, especially during travel, a vehicle can push, press down, and lift a container, but not rotate it, the invention is based on the concept of removing a vessel from the holder by rotating the vessel about a vertical axis, wherein a part within the clamping lug of the holder is rotated relative to the vessel in order to remove the vessel. To this end, the rotatable part, of the clamping lugs, is made of plastic or similar material, which is integrated into the clamping lugs, and is snapped into an axial bearing arrangement of the clamping lug. The part is designed in the form of a cylinder (drum), and is pressed into a stable center position by a type of torsion spring. The part projects beyond the clamping lug at the tip and upper side of the clamping lug, so that even when the clamping lug is deflected, the part contacts all containers regardless of their diameter. At this contact surface, when the part is in its center position, there is preferably a sprayed-on elastomer or other rubber-like material, for example.

For good user-friendliness, the holder has, besides a low installed height and low radial clamping forces, a high coefficient of friction while at the same time permitting very easy removal. The location of the axis of rotation (of the drum part) and the location of the contact surface on the container (high friction) result in a self-locking effect that prevents undesired movement or tipping of the held container.

The beverage holder can reliably hold vessels of various diameters, wherein removal and also insertion of the container are easy to accomplish even during travel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
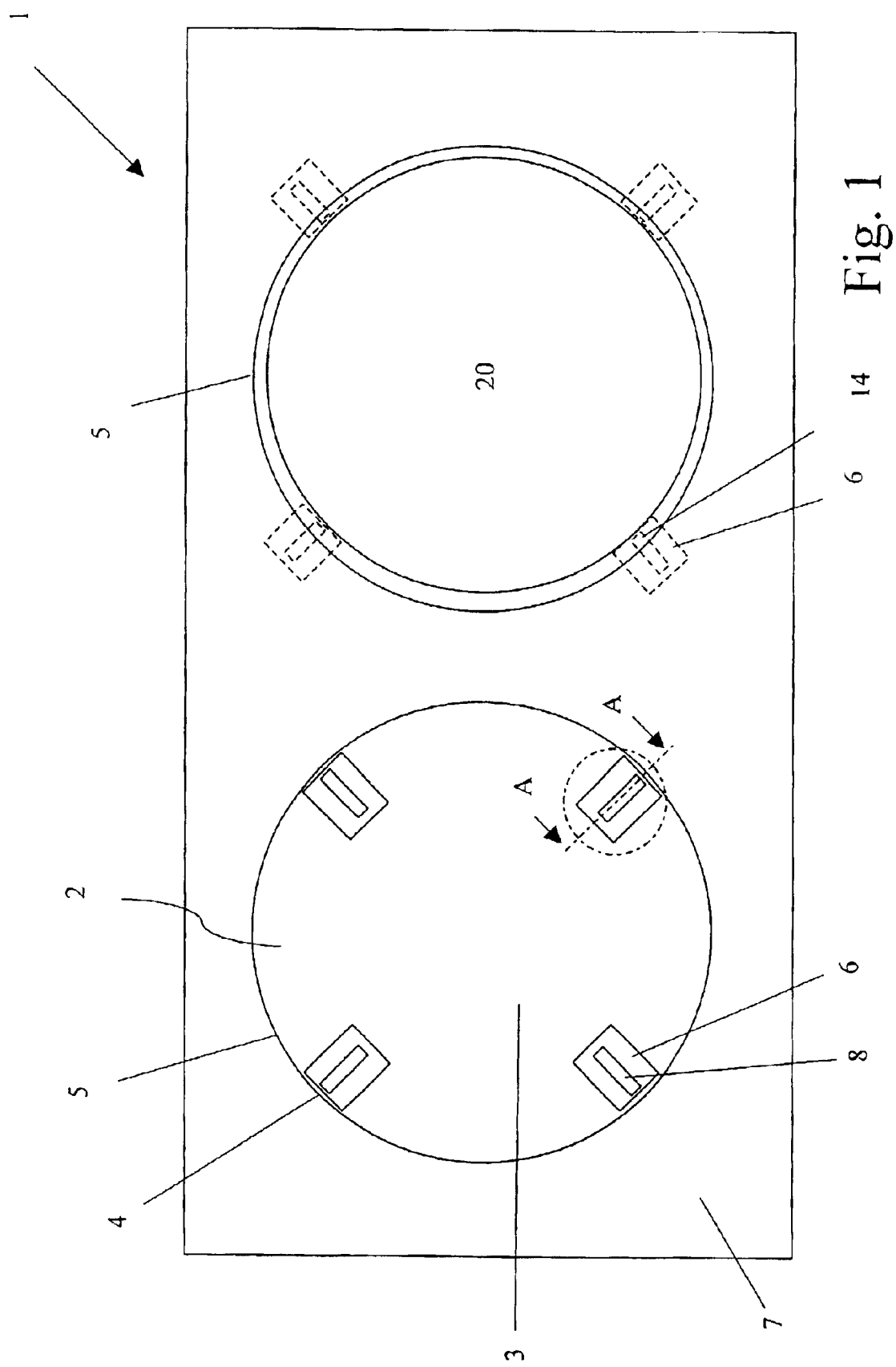
FIG. 1 is a top view of a holder with clamping lugs.

FIG. 1 shows the top view of a holder 1 for two drink containers 20 (vessel), with each having a pot-shaped container receptacle 2 and a bottom part 3. Preferably four clamping lugs 6 are distributed about the circumference of a perimeter wall 5 of the pot-shaped container receptacle 2 in openings 4, whereby the clamping lugs can be pivoted radially under a housing 7 of the holder 1 for functional use of the holder 1. The number of clamping lugs 6 is variable. The clamping lugs 6 point toward the center of the container receptacle 2 and can hold vessels of different diameters. The clamping lugs 6 have in their center an integrated, rotatable plastic part 8, here in the form of a drum, which snaps into an axial bearing 9 in a clamping lug housing 10 of the clamping lug 6. The clamping lugs 6 can be actuated individually or as a group by an annular spring, which is not shown in detail. It is also possible to guide the clamping lugs 6 from underneath by means of a spring element, for example a spiral spring or a leg spring, which is also not shown.

Figure 2:
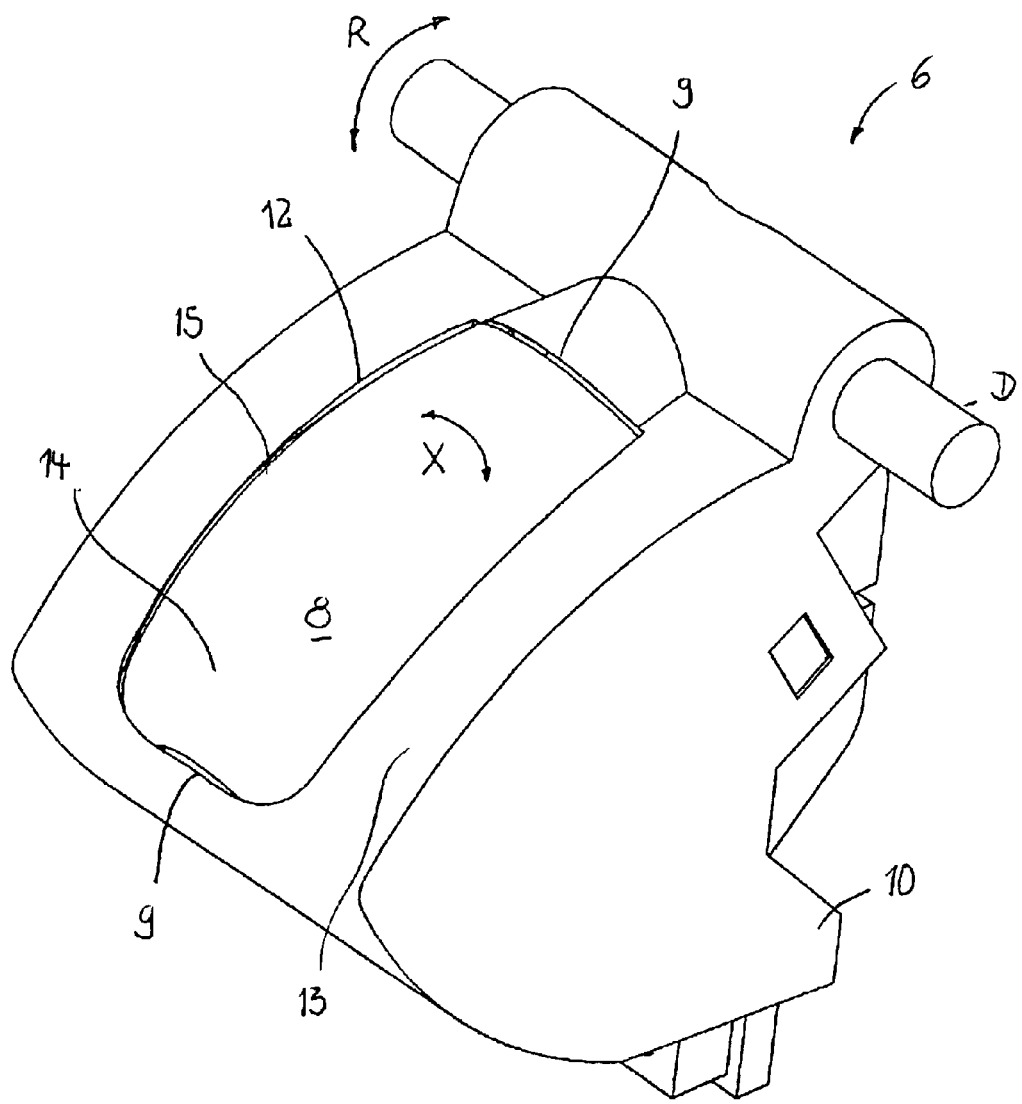
FIG. 2 is an enlarged view of one of the clamping lugs from FIG. 1.

The clamping lugs 6 are shown in more detail in FIG. 2, whereby the location of the bearing 9 is more discernable, by which the portable plastic part 8 can be rotated axially in the direction of the X arrow. The clamping lug 6 pivots in the direction of the R arrow. The drum 8 is held in a stable center position within an aperture 12 of the clamping lug housing 10 by a torsion spring 11 (see FIG. 4). At a tip 13 of the clamping lug housing 10, the surface of the drum 8 projects beyond the housing 10. At this tip 13, which in functional use of the holder 1 forms a contact surface 14, is located a preferably sprayed-on elastomer layer 15. The remaining circumference of the drum 8 has a harder surface 16, such as thermoplastic.

Figure 3:
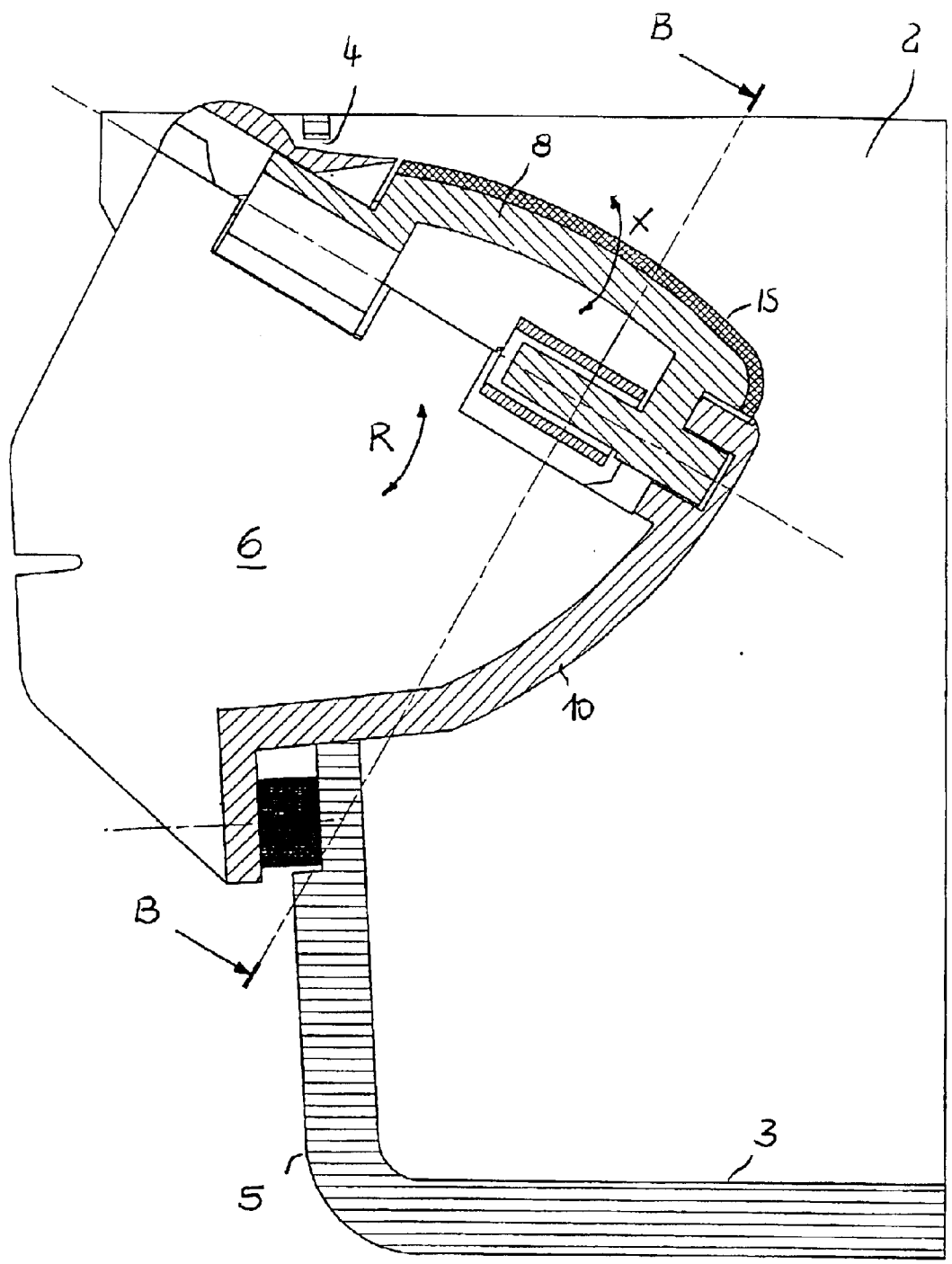
FIG. 3 is the clamping lug as a section A—A from FIG. 1.

FIG. 3 shows the clamping lug 6 in a cross-sectional view along A—A from FIG. 1. Clearly visible is the arrangement of one of the clamping lugs 6 in the opening 4 at the circumference 5 of the container receptacle 2 with bottom part 3.

Figure 4:
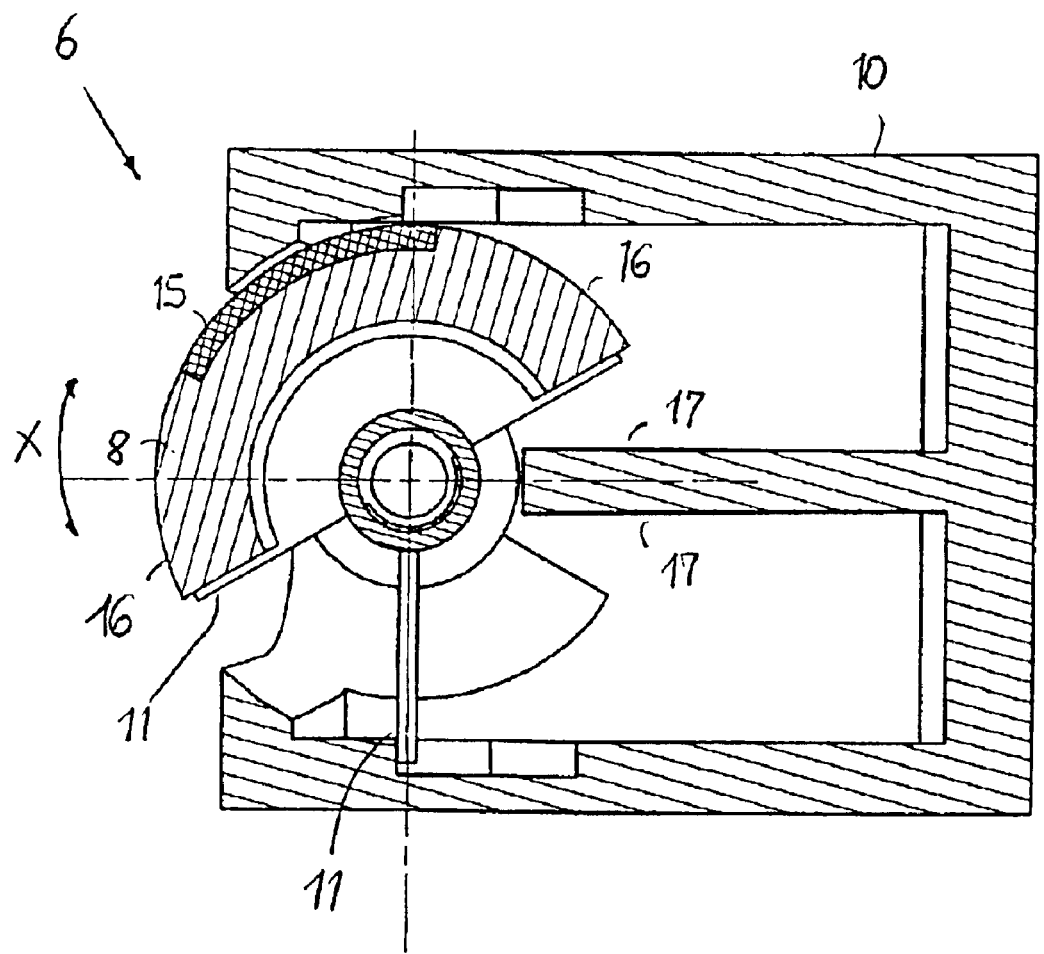
FIG. 4 is the clamping lug as a section B—B from FIG. 3.

In another cross-sectional view, FIG. 4, which is section B—B of FIG. 3, the attachment of the torsion spring 11, here a leg spring, is shown, its mode of operation is described in the following functional description.

The method of operation is as follows:
Upon insertion of the beverage container in the container receptacle 2, the clamping lugs 6 are pivoted in the direction of the arrow R in the openings 4 at the circumference 5 of the container receptacle 2. As a result of the central position of the elastomer layer 15, the container or vessel 20 comes in contact with the elastomer layer 15, whereupon the radially acting clamping lugs 6 press the elastomer layer 15 against the vessel 20. The pivot point D (see FIG. 2) of the clamping lugs 6 lies above the contact surface 14. As a result, the insertion force is relatively low even though the static friction between the elastomer layer 15 and the vessel 20 is comparatively great. As a result of the elastomer layer 15, the clamping lugs 6 grip the vessel 20 in a self-locking fashion, so that the vessel 20 is still held securely, even when the ratio of vessel height to clamp height is great. Tipping over is thus impossible.

To remove the vessel, the vessel 20 itself is rotated, whereby any desired direction of rotation may be selected. This rotation causes rotation of the drums 8 integrated in the clamping lugs 6, and hence also of the leg springs 11, with the result that the harder surface 16 now comes into contact with the vessel 20 instead of the elastomer layer 15. During the process, the leg spring 11 reaches a stop 17 in the clamping lug housing 10, causing the rotation of the rotatable plastic parts 8 to be limited. Alternatively, rotation could also cause the harder surface 16 to drop away relative to the clamping lug 6, which is achieved in that the rotatable plastic part 8 has a non-uniform diameter. Both of these measures accomplish the effect that the vessel 20 is easy to remove, since the friction is sharply reduced during removal. After removal of the vessel, the rotatable plastic part 8 is again rotated definitively back into the center position by the leg spring 11, which also occurs despite rotation if the vessel 20 is not removed.

The beverage container 20 is defined to be a cup, mug, beverage can, beverage bottle or the like.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A holder for vessels, comprising:
   a container receptacle for at least one vessel;
   clamping lugs, positioned into the container receptacle and pivoted radially about a first axis into a circumferential wall of the container receptacle; and
   a rotatable part that is integrated into the clamping lugs and snapped into an axial bearing of the clamping lugs, the rotatable part being rotatable within the clamping lugs about a second axis,
   wherein a direction of the first axis is different than a direction of the second axis.

2. The holder according to claim 1, wherein the clamping lugs have a cut-out in a clamping lug housing to accommodate the rotatable part.

3. The holder according to claim 1, wherein the rotatable part is cylindrical.

4. A holder for vessels, comprising:
   a container receptacle for at least one vessel;
   clamping lugs, positioned into the container receptacle and pivoted radially into a circumferential wall of the container receptacle; and
   a rotatable part that is integrated into the clamping lugs and snapped into an axial bearing of the clamping lugs,
   wherein the rotatable part is pressed into a stable center position by a torsion spring.

5. A holder for vessels, comprising:
   a container receptacle for at least one vessel;
   clamping lugs, positioned into the container receptacle and pivoted radially into a circumferential wall of the container receptacle; and
   a rotatable part that is integrated into the clamping lugs and snapped into an axial bearing of the clamping lugs,
   wherein a portion of the rotatable part projects outwards relative to a tip and an upper side of the clamping lug, so that even when the clamping lug is deflected, the part can contact any vessel regardless of diameter.

6. A holder for vessels, comprising:
   a container receptacle for at least one vessel;
   clamping lugs, positioned into the container receptacle and pivoted radially into a circumferential wall of the container receptacle; and
   a rotatable part that is integrated into the clamping lugs and snapped into an axial bearing of the clamping lugs,
   wherein an elastomer layer or rubber-like material forms a contact portion at a center position of the rotatable part.

7. A holder for vessels, comprising:
   a container receptacle for at least one vessel;
   clamping lugs, positioned into the container receptacle and pivoted radially into a circumferential wall of the container receptacle; and
   a rotatable part that is integrated into the clamping lugs and snapped into an axial bearing of the clamping lugs,
   wherein removal of the vessel is performed by rotation of the vessel.

8. The holder according to claim 7, wherein, during rotation of the vessel, a harder surface of the rotatable part comes into contact with the vessel instead of the elastomer layer.

9. A holder for vessels, comprising:
   a container receptacle for at least one vessel;
   clamping lugs, positioned into the container receptacle and pivoted radially into a circumferential wall of the container receptacle; and
   a rotatable part that is integrated into the clamping lugs and into an axial bearing of the clamping lugs, the rotatable part being rotatable within the clamping lugs about an axis,
   wherein the rotatable part is rotatable within the clamping lugs in a direction that is perpendicular to a pivot direction of the clamping lugs.

* * * * *